United States Patent [19]

Kunkel et al.

[11] 3,905,797

[45] Sept. 16, 1975

[54] ALGAECIDE AND HERBICIDE COMPOSITION

[76] Inventors: Donald H. Kunkel, Rt. No. 2, Box 9, Eagle, Wis. 53119; Donald E. Seymour, 2608 E. Newton Ave., Milwaukee, Wis. 53211

[22] Filed: Mar. 19, 1973

[21] Appl. No.: 342,738

Related U.S. Application Data

[63] Continuation of Ser. No. 76,218, Sept. 28, 1970, abandoned.

[52] U.S. Cl. .......................... 71/66; 71/65; 71/67; 71/82; 71/94
[51] Int. Cl.² ........................................ A01N 13/00
[58] Field of Search .......................... 71/67, 94, 66

[56] References Cited
UNITED STATES PATENTS

| | | | |
|---|---|---|---|
| 2,734,028 | 2/1956 | Domogalla | 71/67 |
| 3,620,711 | 11/1971 | White | 71/94 |
| 3,716,351 | 2/1973 | Kunkel et al. | 71/67 |

OTHER PUBLICATIONS

Rep. Fla. Agric. Exp. Stns., 1967, [Abstract in Weed Abstract, Vol. 19, No. 2, 103 (1970)].

Blackburn, et al., 23rd Proceedings, So. Weed Sci. Soc., 311, 1970.

Sutton et al., 23rd, Proceedings, So. Weed Sci. Soc., 312, 1970.

Sheridan, 18th Proceedings Northeastern Weed Control Conference, 1964, p. 486.

*Primary Examiner*—James O. Thomas, Jr.
*Attorney, Agent, or Firm*—Andrus, Sceales, Starke & Sawall

[57] ABSTRACT

An algaecide and herbicide composition for use in controlling the growth of algae and aquatic and terrestrial plants comprising the combination of a complex, which is the reaction product of either a copper salt or cobalt salt with alkanolamine, and a quaternary dipyridylium compound.

3 Claims, No Drawings

ALGAECIDE AND HERBICIDE COMPOSITION

This is a continuation of application Ser. No. 76,218, filed Sept. 28, 1970 and now abandoned.

This invention relates to a combination algaecide and herbicide composition for use in controlling the growth of algae, as well as submergant or emergant aquatic plant life and terrestrial plant life.

Rivers, lakes, streams, fish ponds, industrial and ornamental water systems, irrigation systems, and the like are frequently polluted by the excessive growth of algae and aquatic plants which impart a distasteful appearance and odor to the water, generally interfere with the flow of the water, and may be harmful to the health. The increased growth of algae and aquatic plants can be traced to the increased introduction of sewage and industrial wastes into the water, as well as fertilizer runoff from farm land and natural fertilization. In the past, various types of algaecides and herbicides have been employed in an attempt to control the growth of algae and aquatic plants. For example, dipyridylium compounds, as disclosed in U.S. Pat. No. 2,823,987, have been widely used to control the growth of aquatic plants, and while these compounds have been effective, there are certain varieties of aquatic plants, such as Hydrilla, against which the dipyridylium compounds are relatively ineffective. Moreover, conventional herbicides have relatively little effect against algae.

In the past, a complex formed by the reaction of a copper salt and an alkanolamine, as disclosed in the U.S. Pat. No. 2,734,028, has been used and has achieved wide success as an algaecide. However, a copper complex has relatively limited action against aquatic plants.

The present invention is directed to a novel composition which is capable of destroying and inhibiting the growth of both algae and aquatic plants. The composition comprises the combination of a dipyridylium compound with a copper or cobalt-alkanolamine complex. The resulting combination exhibits marked synergistic action against certain types of aquatic plants and has the further and unexpected property that certain combinations of the ingredients are less toxic to fish and other forms of marine life than either of the individual components.

The dipyridylium compound to be used in the composition is a quaternary salt having the formula:

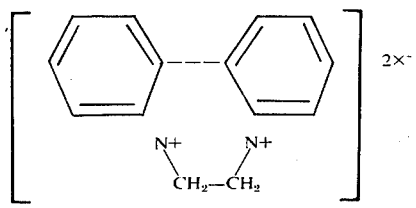

where X is an anionic radical selected from the group consisting of chloride, bromide, iodide, fluoride, and p-toluene sulfonate radicals.

The copper or cobalt complex is formed by the reaction of either a copper or cobalt salt with an alkanolamine. The salt employed to form the complex can be any water soluble salt of copper or cobalt, such as a sulphate, chloride, bromide, acetate, nitrate, citrate, or the like.

The alkanolamine which is reacted with the cobalt or copper salt includes at least one alkanol group containing from one to 10 carbon atoms and may consist of monoethanolamine, diethanolamine, triethanolamine, dimethylethanolamine, diethylethanolamine, aminoethylethanolamine, monoisopropanolamine, diisopropanolamine, triisopropanolamine, methyldiethanolamine, and the like. Of the above-named compounds, triethanolamine has been found to be a very economical and effective agent for use with water soluble copper salts because it requires a smaller amount of the triethanolamine than the other amines to keep the copper ions in solution, while monoethanolamine has been most effective with the cobalt salts due to the fact that monoethanolamine is very soluble in water which permits a higher concentration of cobalt to be held in solution. To form the complex, the alkanolamine is generally used in a weight ratio of .25 to 5 parts to one part of the copper or cobalt salt, and preferably in a weight ratio of 1 to 4 parts of the alkanolamine to one part of the copper or cobalt salt. The resulting complex ion will maintain the metal in solution in a variety of hard waters containing substantial concentrations of alkaline earth metal carbonates and bicarbonates. In addition, the salts or esters of the above alkanolamines can be employed with equal results. It is believed that the hydroxy groups aid in bringing about the formation of the soluble copper or cobalt complex.

The proportions of the active ingredients can vary within wide limits. Generally, the dipyridylium compound will be used in a proportion of 1% to 90% by weight of the active ingredients with 30% to 70% being preferred, while the cobalt or copper complex will be used in the proportion of 1% to 90% of the active ingredients and preferably 30% to 75%.

The composition is generally applied to the body of water in the form of an aqueous solution. Both the dipyridylium compound and the copper or cobalt complex are water soluble, and the active ingredients can be applied to the body of water individually as aqueous solutions, or the active ingredients can be mixed together in aqueous solution prior to application to the body of water. When the dipyridylium compound and the copper and cobalt complex are mixed together in aqueous solution, the solution thickens indicating the presence of what is believed to be a reaction between the ingredients, the exact mechanism of which is not completely known.

The composition in aqueous form is generally packaged as a concentrated solution containing at least 10%, and preferably 50% to 80% by weight of the active ingredients. This high concentration of solids not only aids in preventing decomposition, but provides economies in shipping and handling. At the location of use, the composition can be applied in concentrated form or it can be diluted generally in the ratio of about 5 parts to 100 parts of water and the diluted solution is then applied to the body of water, such that the body of water contains in the range of 0.05 to 20.0 ppm of active ingredients per acre foot and preferably in the range of .25 to 2.0 ppm of active ingredients per acre foot.

When the active ingredients are applied in the form of an aqueous solution, treatment can be made by spraying the aqueous solution on the surface of the water, or alternately the aqueous solution can be introweed (*Lemna* spp.), Hydrilla (*Hydrilla verticielota* Casp.), Bassweed (*Putamogeton amplifolius*), Eelgrass (*Vallisneria Americana* and *Vollisneria* sp.), Water Plantain (*Alisma* sp.), Cattail (*Typha* sp.), Spike Rust (*Eleocharis* sp.), Bulrushes (*Scirpus* sp.), Buttonbush (*Caphalenthus* sp.), Elodea (*Anacharis Canaadensis*), Water Buttercup (*Ranunculus*, sp.), and the like.

The composition of the invention has a synergistic action against certain types of aquatic plants, such as Hydrilla, Eelgrass, Water Plantain, and Bassweed, against which the individual components, i.e. the dipyridylium compound and the copper or cobalt complex, are relatively ineffective. The composition is also effective as a herbicide against certain terrestrial plants such as willow, foxtail, hogweed, clover, vetch, and the like.

In addition, the composition is effective against all common forms of algae, including filamentous algae, such as Cladaphora and Spirogyra, planktonic algae such as Ancystis and Anaebena, chara algae such as *Chara Vulgaris* and Nitrella and swimming pool algae such as black algae.

As a further and unexpected advantage, certain proportions of the ingredients of the invention have been found to be considerably less toxic to fish and marine life than either of the individual components, namely the dipyridylium compound or the cobalt or copper complex. This means that higher concentrations of the composition can be utilized without danger of harming fish or other marine life in the water. In addition to being less toxic to fish, the composition has been found to have a beneficial effect on certain types of fish disorders, such as fin rot, Saprolegnia (white fungus), and bacterial gill disease.

mately 0.6 ppm by weight. This concentration was effective to destroy algae, as well as submerged and floating weeds in the pond.

EXAMPLE II 3 gallons of an aqueous solution containing 6 pounds of 1,1'-ethylene-2,2' dipydridylium dibromide was mixed with 1 gallon of an aqueous solution containing .76 pounds of a cobalt chloride-monomethanolamine complex. At the site of use, the mixture was diluted 99:1 with water and sprayed on the surface of a ¼ acre plot of a pond. In this test, excellent control of algae and Potamogeton pond weed was obtained and the pond was maintained free of algae and pond weeds for the summer.

EXAMPLE III

Laboratory experiments were carried out to determine the herbicidal effectiveness of the composition of the invention against Hydrilla, Southern Naiad and Milfoil. Cuttings of these plants were placed in 2 inch square pots filled with sandy loam soil and one pot of each species was placed in a one gallon, wide mouth jar which had been previously filled with pond water. The jar was covered with clear plastic and placed in a temperature and light intensity control room and in three weeks the plants were well established in the jars.

The composition of the invention was added to the test jars at various concentrations of active ingredients and the herbicidal effectiveness was recorded at 2, 4, and 6 weeks after treatment. A rating scale of 0 to 100 was used with 0 being no effect and 100 being a complete kill. The results of the tests are tabulated in the Table I below:

|  | Rate ppm | Percent control, weeks after treatment | | | | | | | | |
|---|---|---|---|---|---|---|---|---|---|---|
|  |  | Hydrilla | | | Naiad | | | Milfoil | | |
|  |  | 2 | 4 | 6 | 2 | 4 | 6 | 2 | 4 | 6 |
| Copper sulfate- | 0.25+0.25 | 98 | 100 | 100 | 99 | 100 | 100 | 58 | 100 | 100 |
| triethanolamine | 0.25+0.5 | 95 | 100 | 100 | 98 | 100 | 100 | 70 | 100 | 100 |
| complex | 0.25+0.75 | 98 | 100 | 100 | 100 | 100 | 100 | 75 | 100 | 100 |
| + | 0.25+1 | 98 | 100 | 100 | 100 | 100 | 100 | 75 | 100 | 100 |
| 1,1'-ethylene- | 0.5+0.25 | 93 | 100 | 100 | 100 | 100 | 100 | 22 | 95 | 100 |
| 2,2'dipyridylium | 0.5+0.5 | 99 | 100 | 100 | 100 | 100 | 100 | 73 | 100 | 100 |
| bibromide | 0.5+0.75 | 95 | 100 | 100 | 100 | 100 | 100 | 78 | 100 | 100 |
|  | 0.5+1 | 98 | 100 | 100 | 100 | 100 | 100 | 55 | 100 | 100 |
|  | 0.75+0.25 | 95 | 100 | 100 | 95 | 100 | 100 | 50 | 100 | 100 |
|  | 0.75+0.5 | 98 | 100 | 100 | 100 | 100 | 100 | 45 | 100 | 100 |
|  | 0.75+0.75 | 96 | 100 | 100 | 99 | 100 | 100 | 42 | 100 | 100 |
|  | 0.75+1 | 99 | 100 | 100 | 100 | 100 | 100 | 75 | 100 | 100 |
|  | 1+0.25 | 95 | 100 | 100 | 93 | 100 | 100 | 55 | 100 | 100 |
|  | 1+0.5 | 97 | 100 | 100 | 99 | 100 | 100 | 53 | 100 | 100 |
|  | 1+0.75 | 99 | 100 | 100 | 99 | 100 | 100 | 75 | 100 | 100 |
|  | 1+1 | 99 | 100 | 100 | 100 | 100 | 100 | 43 | 99 | 100 |

The results tabulated in the above table indicate that the combination of ingredients was extremely effective in varying concentrations in destroying Hydrilla, Naiad and Milfoil.

EXAMPLE IV

Pool experiments were carried out to show the synergistic effect of the composition of the invention on Hydrilla. In this test, the herbicidal effectiveness of the individual ingredients, the dipyridylium compound and the copper complex, were compared with that of the combination of the ingredients. In carrying out this test, Hydrilla cuttings were plated in outdoor plastic pools 10 feet in diameter. Pond water was used to fill the pools to an average depth of 0.56 meters. The plants at the time of treatment extended to the water surface.

A group of pools were treated with the copper complex alone, a second group of pools were treated with the dipyridylium compound alone, and a third group of pools were treated with the combination of ingredients. The results of the tests are tabulated in Table II below:

TABLE II

|  | Rate ppm | Percent Control Weeks After Treatment | | |
|---|---|---|---|---|
|  |  | Hydrilla | | |
|  |  | 1 | 2 | 4 |
| Copper sulfate-triethanolamine complex | 0.5 | 15 | 20 | 10 |
|  | 1 | 50 | 80 | 87 |
| 1,1' ethylene-2,2' dipyridylium dibromide | 0.5 | 20 | 35 | 25 |
|  | 1 | 20 | 65 | 70 |
| Copper sulfate-triethanolamine complex + 1,1' ethylene-2,2' dipyridylium dibromide | 0.25+1 | 37 | 67 | 93 |
|  | 0.5+1 | 65 | 98 | 100 |
|  | 0.5+0.5 | 50 | 87 | 98 |
|  | 0.75+0.5 | 70 | 95 | 100 |
|  | 0.75+0.75 | 75 | 98 | 100 |

From the above table, it can be seen that the combination of the copper complex and the dipyridylium had a definite synergistic action against Hydrilla. For example, a 1 ppm concentration of the copper complex showed 50, 80, and 87% kill over a period of 1, 2, and 4 weeks, respectively, while a 1 ppm concentration of the didpyridylium compound showed 20, 65, and 70% kill over the same periods. In contrast to this, a combination of the ingredients having a total concentration of 1 ppm of active ingredient (0.5 ppm of the copper complex and 0.5 ppm of the dipyridylium compound) showed 50, 87, and 98% kill over the same 1, 2, and 4 week periods of treatment. These results show the unexpected and synergistic action brought about by the combination of the ingredients with respect to Hydrilla.

EXAMPLE V

Tests were also carried out to determine the toxicity to fish of various known algaecides, as well as the composition of the invention. In accordance with this test procedure, large mouth bass were placed in circulating tanks and the test fish were then treated for disease and fungus control. Three fish were stocked in a series of one gallon test containers and 24 hours after stocking, the fish in the containers were treated with the respective algaecide materials. Periodic checks were made to determine the effects of the concentrations on the fish and the tests were terminated at the end of 96 hours. The results of the tests are tabulated in Table III below with the results expressed as percent mortality:

TABLE III

|  | ppm | Largemouth Bass Hours After Treatment | | | | |
|---|---|---|---|---|---|---|
|  |  | 8 | 24 | 48 | 72 | 96 |
| Copper sulfate-triethanolamine complex | 0.5 | 0[1] | 0 | 0 | 0 | 0 |
|  | 1 | 0 | 0 | 0 | 0 | 0 |
|  | 2 | 0 | 0 | 0 | 0 | 0 |
|  | 4 | 0 | 0 | 0 | 0 | 5 |
|  | 8 | 0 | 0 | 0 | 10 | 33 |
| Copper sulfate | 0.5 | 0 | 0 | 0 | 0 | 0 |
|  | 1 | 0 | 0 | 0 | 0 | 0 |
|  | 2 | 0 | 0 | 0 | 0 | 0 |
|  | 4 | 0 | 0 | 8 | 17 | 17 |
|  | 8 | 0 | 0 | 33 | 73 | 100 |
| 1,1' ethylene-2,2' dipyridylium dibromide + Copper sulfate-triethanolamine complex | 1+4 | 0 | 0 | 0 | 0 | 0 |
|  | 1+8 | 0 | 10 | 25 | 25 | 25 |
|  | 2+4 | 0 | 0 | 0 | 0 | 0 |
|  | 2+8 | 0 | 0 | 25 | 35 | 35 |
|  | 4+4 | 0 | 0 | 0 | 0 | 0 |
|  | 4+8 | 0 | 25 | 75 | 100 | 100 |
| 1,1' ethylene-2,2' dipyridylium dibromide + Copper sulfate | 1+4 | 0 | 0 | 0 | 0 | 0 |
|  | 1+8 | 0 | 0 | 35 | 100 | 100 |
|  | 2+4 | 0 | 0 | 0 | 0 | 0 |
|  | 2+8 | 0 | 40 | 50 | 100 | 100 |
|  | 4+4 | 0 | 0 | 25 | 50 | 50 |
|  | 4+8 | 0 | 60 | 100 | 100 | 100 | and a similar concentration of copper sulfate, a widely used algaecide, resulted in a 100% mortality rate after the same time period. In contrast to this, the combination of 1 ppm of the dipyridylium compound and 8 ppm of the copper complex resulted in a mortality rate of only 25% after 96 hours.

Various modes of carrying out the invention are contemplated as being within the scope of the following claims, particularly pointing out and distinctly claiming the subject matter which is regarded as the invention.

We claim:

1. A synergistic algaecide and herbicide composition, comprising an aqueous solution containing a water soluble complex produced by reacting a water-soluble salt selected from the group consisting of cobalt salts and copper salts with an alkanolamine, said alkanolamine including at least one alkanol group containing from 1 to 10 carbon atoms, said aqueous solution also containing a water-soluble compound having the formula:

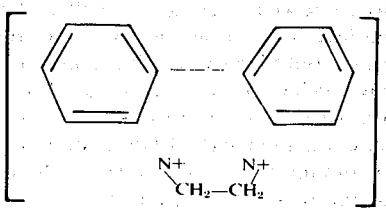

portion of about 90% to 1% by weight of the total weight of said complex and said compound.

2. The composition of claim 1, wherein said complex is formed by the reaction of copper sulfate and triethanolamine and said compound is 1,1'-ethylene-2,2'dipyridylium dibromide.

3. The method of controlling the growth of algae and aquatic plants in bodies of water, comprising the step of bringing into contact with the algae and aquatic plants a composition comprising the combination of an effective amount of a complex produced by reacting a water soluble salt selected from the group of copper salts and cobalt salts with an alkanolamine, and an effective amount of a compound having the formula:

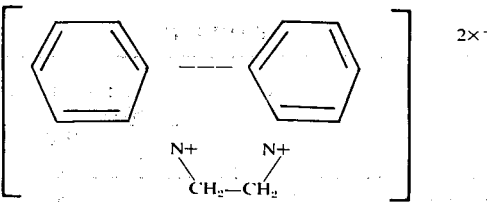

where X is an anionic radical selected from the group consisting of chloride, bromide, iodide, fluoride, p-toluene sulfonate, and mixtures thereof.

* * * * *

UNITED STATES PATENT AND TRADEMARK OFFICE
CERTIFICATE OF CORRECTION

PATENT NO. : 3,905,797
DATED : DONALD H. KUNKEL and DONALD E. SEYMOUR
INVENTOR(S) : September 16, 1975

It is certified that error appears in the above-identified patent and that said Letters Patent are hereby corrected as shown below:

Col. 3, Line 40, Cancel "Nitrella" and substitute therefor ---Nitella---

Columns 3 and 4, Table I, Cancel "bibromide" and substitute therefor ---dibromide---

Col. 6, Line 16 Cancel "didpyridylium" and substitute therefor ---dipyridylium---

Columns 5 and 6, Table III, Cancel "0$\frac{1}{}$" and substitute therefor ---0$\underline{1/}$---

Columns 5 and 6, Table III, After Table III insert ---$\underline{1/}$ Average of 3 aquarium containing 4 fish each.---

Column 7, Line 27, In the Formula, Cancel "2x" and substitute therefor --- $2x^-$ ---

Signed and Sealed this

*thirteenth* Day of *January 1976*

[SEAL]

Attest:

RUTH C. MASON
*Attesting Officer*

C. MARSHALL DANN
*Commissioner of Patents and Trademarks*